United States Patent [19]
Roze

[11] Patent Number: 5,199,217
[45] Date of Patent: Apr. 6, 1993

[54] MOVABLE WINDOW, PARTICULARLY FOR AN AUTOMOBILE

[75] Inventor: Jean-Pierre Roze, Compiegne, France

[73] Assignee: Saint-Gobain Vitrage, Courbevoie, France

[21] Appl. No.: 789,816

[22] Filed: Nov. 12, 1991

Related U.S. Application Data

[63] Continuation of Ser. No. 688,708, Apr. 23, 1991, abandoned, which is a continuation of Ser. No. 191,437, May 9, 1988, abandoned.

[30] Foreign Application Priority Data

May 7, 1987 [FR] France .................. 87 06471

[51] Int. Cl.⁵ .............................................. E05F 11/38
[52] U.S. Cl. ......................................... 49/375; 49/438
[58] Field of Search ................. 49/375, 419, 444, 422, 49/438, 488, 439

[56] References Cited

U.S. PATENT DOCUMENTS

| | | | |
|---|---|---|---|
| 4,694,610 | 9/1987 | Hornivius | 49/375 |
| 4,811,519 | 3/1989 | Gold | 49/375 |

FOREIGN PATENT DOCUMENTS

| | | | |
|---|---|---|---|
| 0735493 | 11/1932 | France | 49/488 |
| 0344098 | 3/1960 | Switzerland | 49/488 |
| 0204949 | 10/1923 | United Kingdom | 49/488 |
| 0733688 | 7/1955 | United Kingdom | 49/488 |
| 2092652 | 8/1982 | United Kingdom | 49/488 |

Primary Examiner—Kenneth J. Dorner
Assistant Examiner—Gerald A. Anderson
Attorney, Agent, or Firm—Oblon, Spivak, McClelland, Maier & Neustadt

[57] ABSTRACT

A window including a movable monolithic or laminated window, equipped along at least one part of its periphery with a molded profile obtained by encapsulating the window, presenting a structure which allows easy and permanent assembly by fitting and/or gripping it with a connecting piece which is part of the mechanism which provides the mobility of the window.

4 Claims, 2 Drawing Sheets

MOVABLE WINDOW, PARTICULARLY FOR AN AUTOMOBILE

This application is a continuation of application Ser. No. 07/688,708, filed Apr. 23, 1991, now abandoned, which was a continuation of U.S. Ser. No. 07/191,437, filed on May 9, 1988 now abandoned.

BACKGROUND OF THE INVENTION

1. Field of the Invention

The invention concerns a movable window, particularly a side window of a transport vehicle, which can be moved particularly by rolling up and down.

2. Background of the Prior Art

Side windows of transport vehicles, particularly automobiles, are generally installed so that they can roll or move in the body, generally the doors of the vehicle. This movable installation makes it necessary to have the window connected with a mechanical raising-lowering system.

In order to facilitate this connection, it has already been proposed that the side window be equipped with a profile made of metal or a plastic material, which is glued onto the glass sheet, and which contains holes for attaching the window to the raising-lowering mechanism.

This type of assembly, while it simplifies the operation of installing the window in the body of the vehicle, is not entirely satisfactory, because it is difficult to perform with automated equipment.

A connection apparatus between the glass and a glass-raising mechanism of the automobile is known, comprising at least one metal binding for the glass, connected to a maneuvering element of the glass-raising mechanism, in which the means for attaching the glass has a frame with means for interlocking, which interlock with the metal binding.

This arrangement makes it possible to eliminate the manual operation of attaching the glass to the glass-holding binding.

The means of producing the window comprises a profile with a U-shaped cross-section, into which the lower edge of the window is placed, with a retention lining being placed in between. One disadvantage of this arrangement is that installation of the window in the attachment means requires further manual operations.

SUMMARY OF THE INVENTION

The invention proposes a window intended to be installed in a vehicle body in a movable manner, which is designed to be either installed automatically in the said body, particularly by a system using robots, or at least to be automatically connected with the connecting piece to the mechanism which assures its mobility, for example via a raising-lowering movement.

The window according to the invention comprises a monolithic or laminated window of glass and/or a plastic material, equipped along at least one part of its periphery with a molded profile obtained by encapsulating the window, presenting a structure which allows easy and permanent assembly by fitting and/or gripping it with a connecting piece which is part of the mechanism which provides the mobility of the window.

The profile molded onto at least one part of the periphery of the window can embrace the entire edge of the said window, namely the two peripheral faces and the bottom edge. In one variation, the molded profile can cover only one of the two faces of the edge of the window and its bottom edge.

The profile can have extremely different forms. It can have one or several grooves and/or reinforcements or straight or round projections, etc. These forms, however, must always allow the glass to be surrounded and installed, particularly by gripping of the connecting piece which is part of the mechanism which provides mobility of the window, a piece which can certainly be adapted in shape to that of the profile. Assembly must be easy, so that it can be carried out by an automated system. It must be permanent, in order to assure reliable and durable operation of the window.

In order to produce the molded profile by molding it onto (or encapsulating) the window, a thermoplastic material, such as polyamide, polyvinyl chloride, polyurethane, ABS, a thermosetting material, for example polyurethane, an elastomer such as EPDM, etc., can be used as the molding material. These base materials can be reinforced with glass or carbon fibers, etc.

The molded profile can be provided on only part of the edge of the window which is to be assembled with the connecting piece.

In one variation, the molded profile is part of a peripheral frame obtained by encapsulation.

The invention also concerns the assembly composed of a monolithic or laminated window equipped with a molded profile and a connecting piece in the respective structures which allows assembly by an automated system.

Other characteristics and advantages of the invention will become evident in the following description of non-limiting embodiments, with reference to the figures.

DETAILED DESCRIPTION OF THE INVENTION

Figure 1:
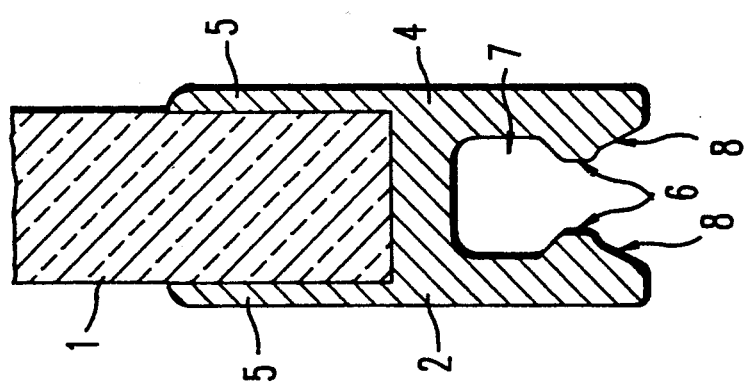
FIG. 1 represents a window intended to be installed so that it moves in an automobile body with a raising-lowering movement.

The invention shown in FIG. 1 comprises a sheet of monolithic glass 1, at the lower part of the periphery of which a molded profile 2 is placed, which allows automated assembly with a connecting piece of an adapted form. The profile can be obtained by classical processes for molding onto glass, for example as described in the publication of the patent EP 127 546.

Figure 2:
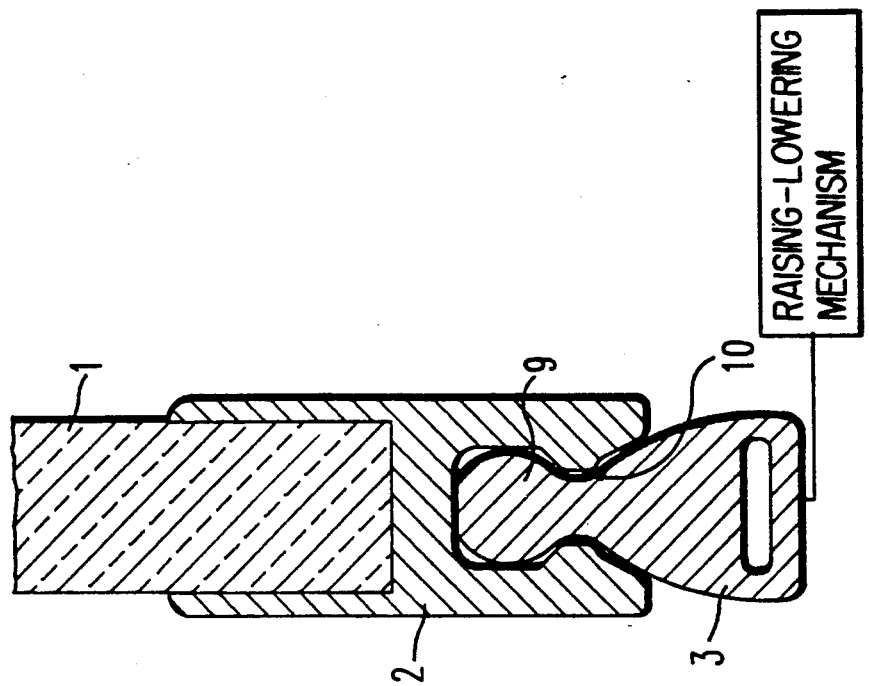
FIG. 2 represents the window of FIG. 1 in the installed position on the connecting piece which is part of the raising-lowering mechanism.

This profile can also be part of a peripheral frame which can have different forms at different parts. The profile 2, made of a plastic material which is rigid enough to assure operation of the window, and has sufficient plastic deformability so that it can be assembled with the connecting piece 3 as shown in FIG. 2. The profile 2 has two wings 4 extending towards the bottom of the framing parts 5.

The two wings 4 are equipped with internal ribs 6 which define a fitting space 7 for the connecting piece 3 and an entry space with inclined walls 8 for the said piece.

Assembly of the window equipped with its profile 2 and the connecting piece 3 can be easily carried out using a robot or another automated system, because it is sufficient to place the window in the axis of the piece 3 and to subject at least one of the two components to mechanical translation to fit them together.

As shown in FIG. 2, in the position assembled with the connecting piece 3, the ribs 6 ensure locking of the rounded head 9 of the connecting piece 3, by settling into the grooves 10 presented by the center part of the piece 3.

As described above, the connecting piece, which can be made of a rigid material here, is attached to the raising-lowering mechanism by gluing, for example.

Figure 3:
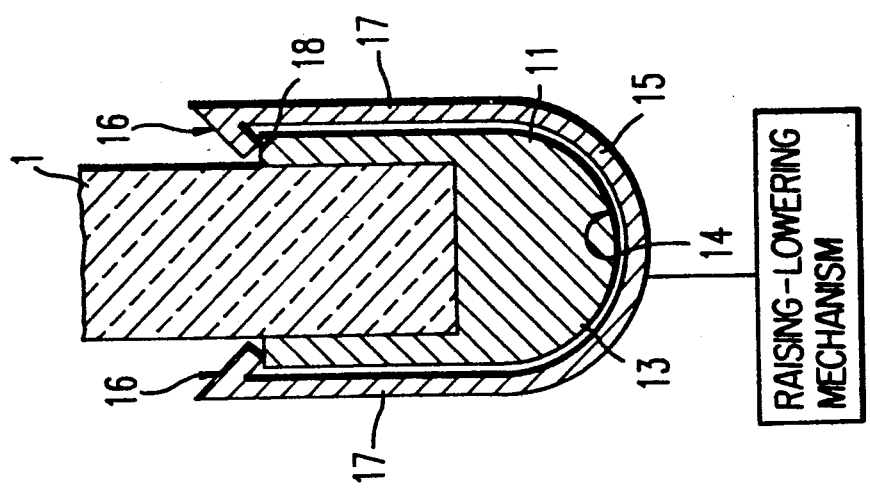
FIG. 3 represents a variation of an assembly of the window and the connecting piece.

FIG. 3 shows a variation of the window according to the invention and of the connecting piece with an adapted form. The profile 11 is molded on in the form of a simple mold on part of the periphery of the window 12. The lower part 13 presents a rounded profile 14 which allows assembly with the connecting piece 15 which has the general shape of a U, with the ends 16 of the wings 17 curved in towards the faces of the window, to be able to wedge against the ends 18 of the additional thickness formed by the molded profile 11. The height of the connecting piece is understood to be calculated as a function of the height of the profile, so it can be adapted to the latter. This piece has elastic deformability, to allow the profile to pass between the ends 16 of the wings 17 during the assembly operation. The connecting piece can be attached to the raising-lowering mechanism by any suitable means.

Figure 4:
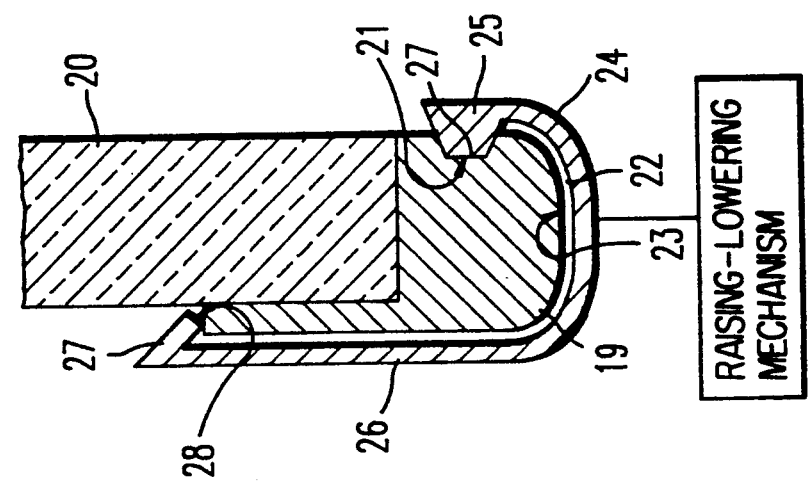

FIG. 4 shows another variation of the window according to the invention. The molded profile 19 here only embraces a part of the edge of the sheet of glass 20. It has a groove 21 in its lower part 22, with a rounded end 23. The connecting piece 24, adapted to the profile 19, has the general shape of a U, with one wing 25 being shorter than the other wing 26. The ends 27 of the wings, which curve in, wedge against the excess thickness 28 of the profile 19 and into the groove 21. The connecting piece 24 must have sufficient elasticity for assembly and gripping. This variation has the particular advantage that it is thinner on at least one of the sides of the window.

Figure 5:
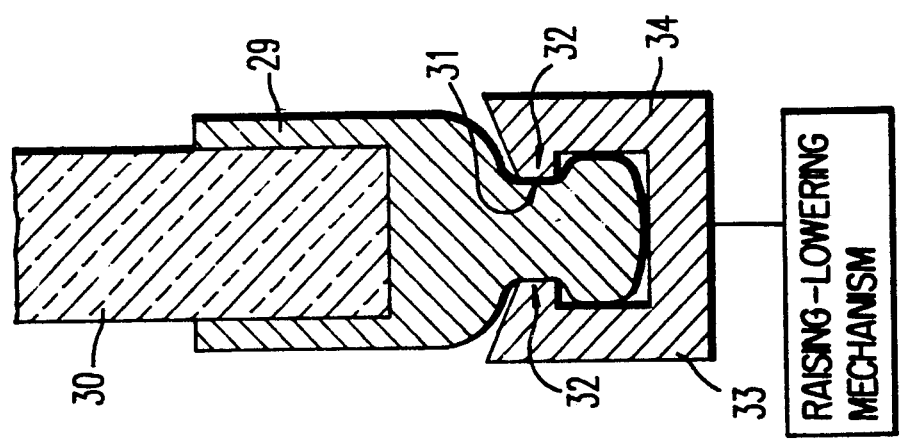
FIGS. 4 and 5 represent other variations of the window and the connecting piece.

FIG. 5 shows another variation, in which the molded profile 29 embracing part of the periphery of the window 30 has two grooves 31 which give the profile the shape of a nipple, into which the ends 32 wedge in the form of appendices directed towards the inside of the two branches 34 of the connecting piece 33 which has a U-shape.

The connecting piece can be attached to the raising-lowering mechanism by any suitable means.

As in the preceding variations, the rigidity and elasticity of the molded profile and the connecting piece are determined in such a way as to allow them to be brought together by automated systems and to obtain good operation of the movable window.

The movable window according to the invention can be used, for example, as a side window which rolls up and down in the body of an automobile.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertically movable window, comprising a monolithic or laminated window of glass or a plastic material or both, equipped along at least one part of a periphery thereof with a molded thermoplastic profile having a fitting space and an opening defined by ribs and a connecting piece having a rounded head and a neck bisected by an axis in the plane of the window which secures a window moving mechanism to the window, wherein the molded profile is obtained by molding said profile onto at least a portion of the window periphery, the profile ribs locking comprising ribs to ensure locking of the rounded head of the connecting piece in the fitting space the molded profile.

2. A window according to claim 1, wherein said fitting space is defined by two wings on which the ribs are internally formed and an entry space with inclined walls leading to said opening.

3. A window according to claim 1, wherein the molded profile is an integral part of a peripheral molded frame.

4. A window according to claim 1, wherein the molded profile covers only part of the periphery of the window.

* * * * *